(12) United States Patent
Silvestrini

(10) Patent No.: US 9,545,836 B2
(45) Date of Patent: Jan. 17, 2017

(54) JOINT SYSTEM FOR AN AUTOMOTIVE GLAZING UNIT, GLAZING UNIT EQUIPPED WITH THE SYSTEM, AND METHOD FOR FITTING THE GLAZING UNIT

(71) Applicant: SAINT-GOBAIN GLASS FRANCE, Courbevoie (FR)

(72) Inventor: Laurent Silvestrini, Bussy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/427,726

(22) PCT Filed: Sep. 4, 2013

(86) PCT No.: PCT/FR2013/052034
§ 371 (c)(1),
(2) Date: Mar. 12, 2015

(87) PCT Pub. No.: WO2014/041279
PCT Pub. Date: Mar. 20, 2014

(65) Prior Publication Data
US 2015/0246603 A1    Sep. 3, 2015

(30) Foreign Application Priority Data
Sep. 14, 2012   (FR) ...................... 12 58663

(51) Int. Cl.
*B60J 10/02* (2006.01)
*B60J 10/00* (2016.01)

(52) U.S. Cl.
CPC ............. *B60J 10/0082* (2013.01); *B60J 10/24* (2016.02); *B60J 10/365* (2016.02); *B60J 10/70* (2016.02); *Y10T 29/49826* (2015.01)

(58) Field of Classification Search
CPC ............. B60J 10/02; B60J 1/004; B60J 1/005; B60J 1/006; B60J 1/007; B60J 10/36; B60J 10/45; B65D 81/02; E06B 7/16
USPC .......................................................... 296/93
See application file for complete search history.

(56) References Cited

FOREIGN PATENT DOCUMENTS

| DE | 1 690 860 | 1/1955 |
|---|---|---|
| EP | 2 253 556 | 11/2010 |
| FR | 2 205 622 | 5/1974 |
| FR | 2 952 900 | 5/2011 |

OTHER PUBLICATIONS

Machine translation of EP 2253556.*
Machine translation of FR 2205622.*
Machine translation of FR 2952900.*
International Search Report Issued Nov. 11, 2013 in PCT/FR13/052034 Filed Sep. 4, 2013.

* cited by examiner

*Primary Examiner* — H Gutman
(74) *Attorney, Agent, or Firm* — Oblon, McClelland, Maier & Neustadt, L.L.P.

(57) ABSTRACT

A joint system for an automotive glazing unit, or a windshield, the system including: a profiled bead including a hollow part that is elongate and opened toward the top, the profiled bead exhibiting in cross section a left neck part and a right neck part, a core including a pin placed inside the hollow part and a gripping mechanism allowing the pin to be removed from the hollow part. In cross section, the gripping mechanism forms a loop and includes a base located between the pin and the hollow part portion and a ring placed above the core.

14 Claims, 2 Drawing Sheets

JOINT SYSTEM FOR AN AUTOMOTIVE GLAZING UNIT, GLAZING UNIT EQUIPPED WITH THE SYSTEM, AND METHOD FOR FITTING THE GLAZING UNIT

BACKGROUND

The present invention relates to a joint system for an automotive glazing unit.

This glazing unit is a fixed automotive glazing unit, in particular for an automobile, especially a roof glazing unit, a windshield, or a rear window and is in particular a curved glazing unit.

The present invention more particularly relates to a joint system for an automotive glazing unit comprising:
 a profiled bead comprising a hollow part that is elongate and opened toward the top, said profiled bead exhibiting in cross section a left neck part and a right neck part,
 a core comprising a pin placed inside said hollow part and a rod placed outside said hollow part and
 a gripping means allowing said pin to be removed from said hollow part.

The core serves to protect the hollow part so as to preserve its shape; this is therefore a temporary elongate element that is removed after the glazing unit has been installed in the opening that it must close of a vehicle, during manufacture of the vehicle and before the vehicle is completely finished. This core is therefore not present in the finished vehicle.

The hollow part is generally provided all the way along one edge of the glazing unit, such as, for example, the lower edge of a windshield.

The hollow part is then used to clip-fasten a plastic element, sometimes called the "water box" or "cowl vent cover", containing a boss intended to be inserted into the hollow part. It is important for the pin to be able to be removed from the hollow part without damaging it in order for the subsequent clip-fastening of this plastic element to proceed correctly.

It is proposed in European patent application EP 2 253 556 to use at least one gripping means consisting of a tongue having a part that passes round the pin inside the hollow part and a part that projects out of the hollow part of the profiled bead, above the pin.

This tongue is satisfactory in the sense that it effectively allows recourse to an instrument for removing the core to be avoided and thus obviates any risk of damaging the hollow part of the profiled bead during removal of the core.

However, this solution is not completely satisfactory because it implies the use of an adhesive on the internal face of the tongue and if the two parts of the tongue that are adhesively bonded to each other above the core are not well bonded to each other, then the free bonding surface may adhesively bond to the profiled bead or to the glazing unit and may leave traces.

Furthermore, as the pulling force that can be exerted on each tongue is relatively small, in order to be able to correctly remove the core all the way along the hollow part without causing the tongue to rupture, it is necessary to provide a large number of tongues all the way along the core and the operation of pulling on each tongue takes time. As this operation is performed on the general assembly line of the vehicle, it would be preferable to carry out the removal operation of the core more rapidly.

BRIEF SUMMARY

The present invention is intended to remedy the drawbacks of the prior art by proposing a joint system the gripping means of which, that allows the core to be removed, is both easier to position when the core is inserted into the hollow part and simultaneously still makes it easier to remove the core and in particular allows the core to be removed more rapidly.

The subject of the invention is thus, in its broadest acceptance, a joint system for an automotive glazing unit, in particular a windshield, said system comprising:
 a profiled bead comprising a hollow part that is elongate and opened toward the top, said profiled bead exhibiting in cross section a left neck part and a right neck part,
 a core comprising a pin placed inside said hollow part and
 a gripping means allowing said pin to be removed from said hollow part.

This system is noteworthy in that, seen in cross section, said gripping means forms a loop and comprises on the one hand a base located between said pin and said hollow part portion and on the other hand a ring placed above said core.

Thus, according to the invention, a loop is arranged in order for the core to be inside the loop and for this loop to be able to be seized above the core in order to allow the core to be removed from the hollow part of the profiled bead. Removal of the core is thus easier than with the tongue of the prior art because the pulling forces exerted in order to remove it are distributed along the loop.

If pulling on the loop in a given location of the core is not sufficient to allow all the core to be removed, this loop may be slid along the core in order to aid removal of the core in locations where it is still present in the hollow part or near locations where it is still present in the hollow part. Removal of the core is thus more rapid than with the tongues of the prior art because there is no longer any need to release one tongue in order to take hold of another and pull on it: it is enough to maintain a pulling force on the loop while moving it along the core.

In particular, it is preferable for said loop to have, at rest, without the core inside, an inside diameter d comprised between 20 mm and 50 mm and preferably comprised between 30 mm and 40 mm, in order to present material in a necessary and sufficient amount to be gripped above the core.

Preferably, the loop has a width w comprised between 3 mm and 30 mm and/or the part of the ring located above the glazed element has a height h comprised between 3 and 30 mm, in order to make it easier for an operator to grip it and move it along the core.

As a variant, said gripping means is a wire that is closed on itself, preferably without superposition of material (of integral construction); furthermore said wire preferably has a diameter comprised between 0.8 mm and 2 mm. This variant is very economical to manufacture.

As another variant, said gripping means is a strip that is closed on itself, preferably without superposition of material (of integral construction), said strip having a length L comprised between 3 mm and 10 mm. The strip may be from 0.05 mm to 0.5 mm in thickness. This strip variant ensures a good withstand of the loop to the pulling forces allowing the extraction of the core.

Preferably, the loop of the ring, before removal of the core, extends from the left neck part to the right neck part of the profiled bead.

Two embodiments are envisioned: said gripping means may be unique or two gripping means are provided, preferably each one near each longitudinal end of said core.

The present invention also relates to a method for fitting a glazing unit comprising a joint system according to the invention into a body opening, in which said gripping means in the form of one loop at least is slid along the core during removal of the core.

When a single gripping means is provided, the loop is slid all the way along the core while pulling it upwards in order to remove the core.

When two gripping means are provided, one near each end or both toward the center along the length of the core, each loop is slid over about half the length of the core, from the end toward the center or from the center toward the end, while pulling upwards in order to remove the core.

The present invention also relates to an automotive glazing unit, in particular a windshield, said glazing unit comprising a glazed element and a joint system according to the invention.

The present invention in particular relates to such a glazing unit that is adhesively bonded beforehand in an opening via at least one bead of adhesive, i.e. before the method has been implemented.

The present invention not only allows the step of core removal, all the way along the hollow part of the profiled bead, to be simplified, but furthermore allows this removal to be carried out more rapidly.

In addition, the present invention allows removal of the core at a lower cost since it is no longer necessary to provide many gripping means, because one is enough, or even two are enough, and it is no longer necessary to use expensive adhesive chemicals.

Furthermore, industrialization of the solution is simple: it is not necessary to calculate what number of fixed tongues is necessary to be able to remove all of the core because the loop is movable along the core.

As there is no adhesive, there is no risk of pollution or untimely adhesive bonding.

BRIEF DESCRIPTION OF THE DRAWINGS

The present invention will be better understood on reading the following detailed description of nonlimiting embodiments and the appended figures.

In these figures, the proportions between the various elements are respected in each figure but the background elements are in general not shown, for the sake of legibility.

DETAILED DESCRIPTION

The present invention relates to the assembly and integration of a glazing unit into a body opening of a vehicle.

Figure 1:
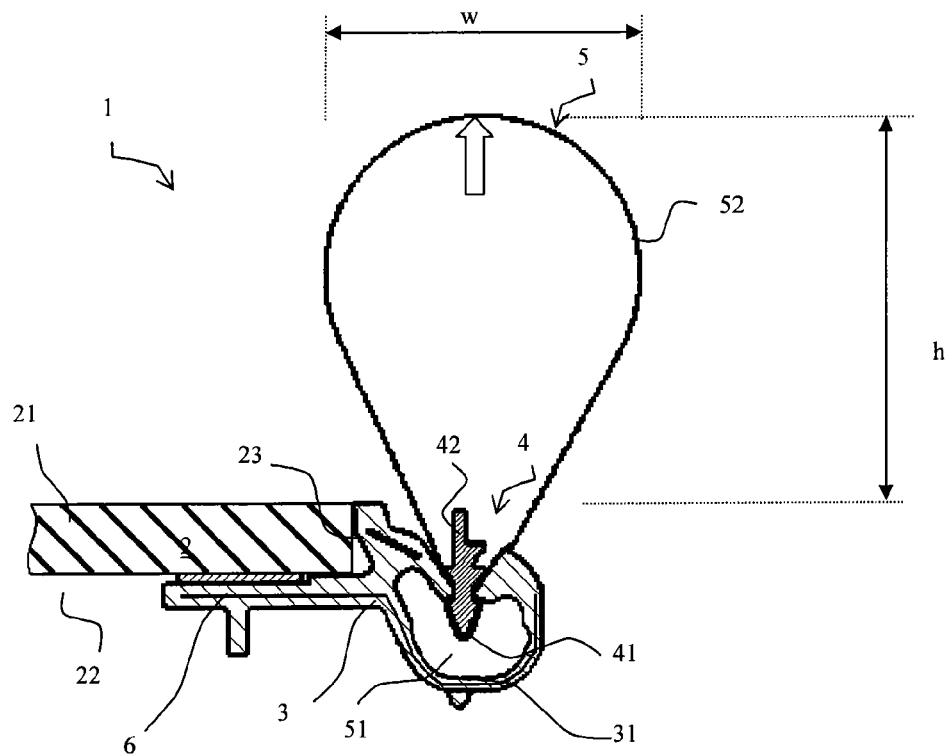
FIG. 1 illustrates a cross-sectional view of an automotive glazing unit according to the invention equipped with a profiled bead.

The glazing unit 1 according to the invention, which is illustrated in FIG. 1, is an automobile windshield, partially illustrated and positioned flat for the sake of simplicity. It comprises a glazed element 2 equipped with a portion of a profiled bead 3.

The glazing unit 1, is intended to close an opening, producing a separation between an interior space of the vehicle and a space exterior to the vehicle. The glazed element 2 thus has an external face 21 intended to be turned toward the external space, an internal face 22 intended to be turned toward the internal space, and a peripheral edge face 23.

Orientation is, throughout the present document, given with reference to the orientation in FIG. 1.

The glazed element may be monolithic, i.e. consist of a single sheet of material, or be composite, i.e. consist of a plurality of sheets of material between which is inserted at least one layer of adhesive material in the case of laminated glazing units. The one or more sheets of material may be mineral sheets, especially sheets made of glass, or organic sheets, especially sheets made of plastic.

In the case of an automotive glazing unit, the glazing unit generally has at least partially on its periphery an ornamental strip, not illustrated here. This ornamental strip in general results from deposition of an enamel, deposited on the internal face of the glazing unit or on an intermediate face of the glazing unit for composite glazing units, but it may also result from partial and/or peripheral tinting of one of the sheets of material used, especially of a sheet of organic material.

When the glazed element is made of an organic material, it is manufactured before the invention is implemented by molding the constituent material of the glazed element in a molding device comprising a mold comprising at least one fixed mold part and one movable mold part that is movable relative to the fixed mold part, said mold parts interacting in the closed state of the mold, during the molding step, to form a molding cavity having in cross section the cross-sectional shape of the glazed element. Often, the glazed element made of organic material is not flat but curved.

When the glazed element is made of a mineral material, it is manufactured before implementation of the invention by melting mineral material into a flat sheet, then by cutting this sheet and optionally bending this sheet.

In FIG. 1, the glazed element 2 is a laminated glazing unit.

The joint system according to the invention comprises:
a profiled bead 3 comprising a hollow part 31 that is elongate and opened toward the top, said profiled bead 3 exhibiting in cross section a left neck part 32 and a right neck part 33,
a core 4 comprising a pin 41 placed inside said hollow part 31 and a rod 42 placed outside the hollow part 31, between the left neck part 32 and the right neck part 33 and
a gripping means 5 allowing the pin 41 to be removed from the hollow part 31.

As may be seen in FIG. 1, the profiled bead 3 comprises an internal part, intended to be positioned under the internal face 22 of the glazed element, and a lateral part, intended to be positioned beside the edge face 23 of the glazed element and an external part comprising a lip located flush with the external face 21 of the glazed element.

Figure 3:
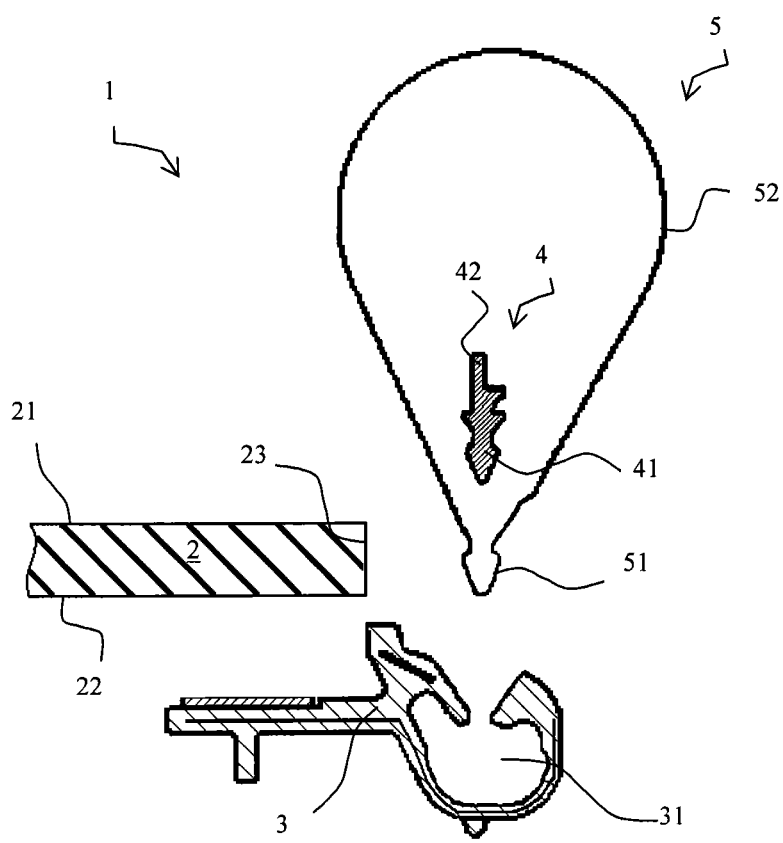
FIG. 3 illustrates an exploded view of the glazing unit illustrated in FIG. 1.

As may be seen in FIG. 3, in the exploded view, the hollow part 31 of the profiled bead is open toward the top and this aperture has in cross section a left neck part 32 and a right neck part 33.

The profiled bead 3 is here reinforced by a metal insert.

Mechanical coupling between the pin 41 of the core and the hollow part 31 of the profiled bead is of the mortise and tenon type, with, here, the cross-sectional shape of the pin 41 being complementary to the hollow part 31: this complementarity is such that, in cross section, the outside dimensions of the pin 41 are smaller than the inside dimensions of the hollow part 31, which thus forms as a groove into which the pin is clip-fastened.

An adhesive 6 is furthermore provided in order to allow the profiled bead to be adhesively bonded against the internal surface 22 of the glazed element.

The core 4 is provided all the way along the hollow part 31 in order to protect the configuration of this hollow part until this hollow part is used to clip-fasten a body element generally made of plastic (especially called the "cowl vent cover").

According to the invention, seen in cross section, the gripping means 5 forms a loop and comprises on the one hand a base 51 located between the pin 41 and the hollow part portion 31 and on the other hand a ring 52 placed above the core 4.

Seen in cross section, the loop therefore passes right round the core; it completely encircles the core.

Figure 2:
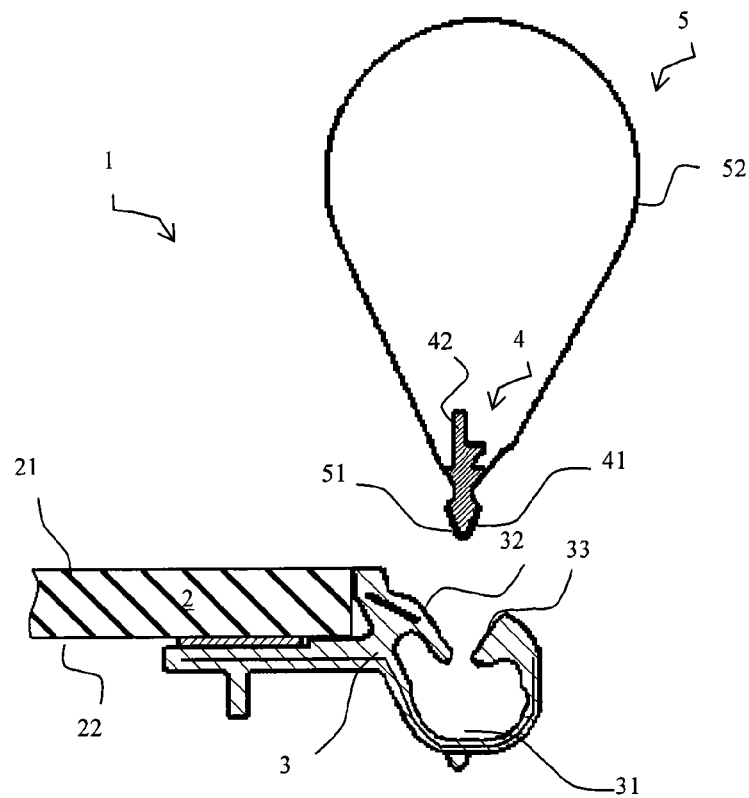
FIG. 2 illustrates a cross-sectional view of the glazing unit illustrated in FIG. 1, during the core removal operation.

The ring allows a finger or even a tool to be inserted in order to apply an upward pulling force, as is illustrated by the double arrow in FIG. 1, in order to remove the core 4 from the hollow part 31 as may be seen in FIG. 2.

To do this, the loop may have a width w comprised between 3 mm and 30 mm and/or the part of the ring 52 located above the glazed element has a height h comprised between 3 and 30 mm.

As may be seen in FIG. 1, the base 51 is located against the surface of the pin 41 when the upward pulling operation is carried out, but is not necessarily located against the surface of the pin 41 before this pulling operation is carried out since there is no adhesive bond between the gripping means and the core.

FIG. 2 shows the core removed from the hollow part of the profiled bead, just above the neck of this hollow part.

In general, the core is removed after the glazing unit has been adhesively bonded to the body opening that it must close; however, this opening and the bead of adhesive necessary for the adhesive bonding are not illustrated in FIGS. 1 and 2.

FIG. 3 simply shows details of the various elements of the glazing unit 1 in FIGS. 1 and 2.

Figure 4:
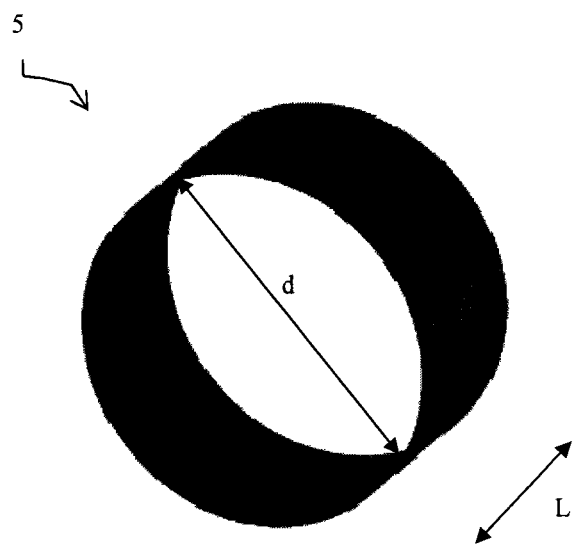
FIG. 4 illustrates a perspective view, of the ring according to the invention.

FIG. 4 shows the gripping means 5, which is a strip that is closed on itself; this strip is here closed on itself without superposition of material; this strip having a length L comprised between 3 mm and 10 mm, such as for example 5 mm here.

The ring is made of plastic. It is for example made of polypropylene or of polyester.

In FIG. 4, the loop is illustrated without the core inside, in its rest state. The loop is flexible such that when it is not under stress it has a cylindrical tube shape. It has an inside diameter d comprised between 20 mm and 50 mm and preferably comprised between 30 mm and 40 mm, such as for example 35 mm here. It may be from 0.05 mm to 0.5 mm in thickness, such as for example 0.08 mm here.

In the absolute, the loop may be formed in order for its profile, in its rest state, out of contact with the core, to be similar to that of the pin of the core and/or the hollow part of the profiled bead; however, it is simpler to use a flexible ring that deforms when it is pulled upon, without breaking.

The present invention is described above by way of example. It is understood that those skilled in the art will be able to produce various variants of the invention without however departing from the scope of the patent as defined by the claims.

The invention claimed is:

1. A joint system for an automotive glazing unit, or a windshield, the system comprising:
   a profiled bead comprising a hollow part that is elongate and opened toward a top, the profiled bead exhibiting in cross section a left neck part and a right neck part;
   a core comprising a pin placed inside the hollow part; and
   a gripping means that is slidable along a length the core and allows the pin to be removed from the hollow part,
   wherein, seen in cross section, the gripping means forms a loop and comprises a base located between the pin and the hollow part and a ring placed above the core, and
   wherein there is no bond between the gripping means and the core.

2. The system as claimed in claim 1, wherein the loop without the core inside has an inside diameter between 20 mm and 50 mm or between 30 mm and 40 mm.

3. The system as claimed in claim 1, wherein the loop has a width between 3 mm and 30 mm.

4. The system as claimed in claim 1, wherein the gripping means is a wire that is closed on itself, or without superposition of material, the wire having a diameter between 0.8 mm and 2 mm.

5. The system as claimed in claim 1, wherein the gripping means is a strip that is closed on itself, or without superposition of material, the strip having a length between 3 mm and 10 mm.

6. The system as claimed in claim 1, wherein the loop of the ring extends from the left neck part to the right neck part.

7. The system as claimed in claim 1, wherein the gripping means is unique or two gripping means are provided, or each one near each longitudinal end of the core.

8. An automotive glazing unit, comprising a glazed element and a joint system as claimed in claim 1.

9. A method for fitting a glazing unit comprising:
   inserting a joint system as claimed in claim 1 into a body opening, including sliding the gripping means, in a form of a loop, along a length of the core during removal of the core from the profiled bead.

10. The system as claimed in claim 9, wherein a part of the ring located above the glazed element has a height between 3 and 30 mm.

11. The system as claimed in claim 9, wherein the loop has a width between 3 mm and 30 mm and a part of the ring located above the glazed element has a height between 3 and 30 mm.

12. The system as claimed in claim 1, wherein the ring is made of polypropylene or of polyester.

13. The system as claimed in claim 1, wherein the gripping means, in a rest state without the core inside, has a cylindrical tube shape.

14. The system as claimed in claim 1, wherein the gripping means is a flexible ring that deforms when pulled upon.

* * * * *